United States Patent
Lindley et al.

(10) Patent No.: US 9,817,232 B2
(45) Date of Patent: *Nov. 14, 2017

(54) HEAD MOVEMENT CONTROLLED NAVIGATION AMONG MULTIPLE BOARDS FOR DISPLAY IN A HEADSET COMPUTER

(71) Applicant: Kopin Corporation, Westborough, MA (US)

(72) Inventors: Craig Lindley, West Bridgford (GB); James Woodall, West Bridgford (GB); David Niland, West Bridgford (GB); Jeffrey J. Jacobsen, Hollister, CA (US); Christopher Parkinson, Richland, WA (US); Stephen A. Pombo, Campbell, CA (US)

(73) Assignee: Kopin Corporation, Westborough, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/827,187

(22) Filed: Aug. 14, 2015

(65) Prior Publication Data

US 2015/0346489 A1 Dec. 3, 2015

Related U.S. Application Data

(63) Continuation of application No. 14/142,272, filed on Dec. 27, 2013, now Pat. No. 9,316,827, which is a
(Continued)

(51) Int. Cl.
*G02B 27/00* (2006.01)
*G02B 27/01* (2006.01)
(Continued)

(52) U.S. Cl.
CPC ....... *G02B 27/0093* (2013.01); *G02B 27/017* (2013.01); *G06F 3/011* (2013.01);
(Continued)

(58) Field of Classification Search
CPC ... G02B 27/0093; G02B 27/017; G06F 3/011; G06F 3/012
(Continued)

(56) References Cited

U.S. PATENT DOCUMENTS

| 4,567,479 A | 1/1986 | Boyd |
| 5,526,022 A | 6/1996 | Donahue et al. |

(Continued)

FOREIGN PATENT DOCUMENTS

| CN | 101196793 A | 6/2008 |
| CN | 101349944 A | 1/2009 |

(Continued)

OTHER PUBLICATIONS

Notification of Transmittal of the International Search Report and Written Opinion for PCT/US2013/078051, "Lifeboard—Series of Home Pages for Head Mounted Displays (HMD) That Respond to Head Tracking", dated Apr. 22, 2014.
(Continued)

*Primary Examiner* — Fred Tzeng
(74) *Attorney, Agent, or Firm* — Hamilton, Brook, Smith & Reynolds, P.C.

(57) ABSTRACT

To assist with hands-free computing, the Head Mounted Display or Headset Computer utilizes a series of user configurable Home Pages that contain the shortcuts and widgets the user wants and one or more head movements. This allows the user to design a user interface environment which gives desired information, in the desired order.

20 Claims, 8 Drawing Sheets

Related U.S. Application Data continuation-in-part of application No. 13/234,916, filed on Sep. 16, 2011, now Pat. No. 9,122,307.

(60) Provisional application No. 61/748,757, filed on Jan. 4, 2013, provisional application No. 61/384,586, filed on Sep. 20, 2010.

(51) Int. Cl.
  *G06F 3/16* (2006.01)
  *G06F 3/01* (2006.01)

(52) U.S. Cl.
  CPC .............. *G06F 3/012* (2013.01); *G06F 3/013* (2013.01); *G06F 3/017* (2013.01); *G06F 3/167* (2013.01)

(58) Field of Classification Search
  USPC ........................................................ 345/156
  See application file for complete search history.

(56) References Cited

U.S. PATENT DOCUMENTS

| | | | |
|---|---|---|---|
| 5,742,263 | A * | 4/1998 | Wang .................. G02B 27/017 345/7 |
| 5,990,793 | A | 11/1999 | Bieback |
| 6,010,216 | A | 1/2000 | Jesiek |
| 6,067,069 | A | 5/2000 | Krause |
| 6,084,556 | A | 7/2000 | Zwern |
| 6,108,197 | A | 8/2000 | Janik |
| 6,198,462 | B1 | 3/2001 | Daily et al. |
| 6,204,974 | B1 | 3/2001 | Spitzer |
| 6,325,507 | B1 | 12/2001 | Jannard |
| 6,408,257 | B1 | 6/2002 | Harrington et al. |
| 6,421,064 | B1 | 7/2002 | Lemelson et al. |
| 6,424,410 | B1 | 7/2002 | Pelosi |
| 6,538,676 | B1 | 3/2003 | Peter |
| 6,798,391 | B2 | 9/2004 | Peterson, III |
| 6,798,443 | B1 | 9/2004 | Maguire, Jr. |
| 6,853,293 | B2 | 2/2005 | Swartz et al. |
| 6,900,777 | B1 | 5/2005 | Hebert et al. |
| 6,922,184 | B2 | 7/2005 | Lawrence et al. |
| 6,956,614 | B1 | 10/2005 | Quintana et al. |
| 6,966,647 | B2 | 11/2005 | Jannard et al. |
| 7,004,582 | B2 | 2/2006 | Jannard et al. |
| 7,013,009 | B2 | 3/2006 | Warren |
| 7,082,393 | B2 | 7/2006 | Lahr |
| 7,147,324 | B2 | 12/2006 | Jannard et al. |
| 7,150,526 | B2 | 12/2006 | Jannard et al. |
| 7,213,917 | B2 | 5/2007 | Jannard et al. |
| 7,216,973 | B2 | 5/2007 | Jannard et al. |
| 7,219,994 | B2 | 5/2007 | Jannard et al. |
| 7,231,038 | B2 | 6/2007 | Warren |
| 7,249,846 | B2 | 7/2007 | Grand et al. |
| 7,278,734 | B2 | 10/2007 | Jannard et al. |
| 7,331,666 | B2 | 2/2008 | Swab et al. |
| 7,445,332 | B2 | 11/2008 | Jannard et al. |
| 7,452,073 | B2 | 11/2008 | Jannard et al. |
| 7,458,682 | B1 | 12/2008 | Lee |
| 7,461,936 | B2 | 12/2008 | Jannard |
| 7,494,216 | B2 | 2/2009 | Jannard et al. |
| 7,512,414 | B2 | 3/2009 | Jannard et al. |
| 7,620,432 | B2 | 11/2009 | Willins et al. |
| 7,682,018 | B2 | 3/2010 | Jannard |
| 7,740,353 | B2 | 6/2010 | Jannard |
| 7,744,213 | B2 | 6/2010 | Jannard et al. |
| 7,753,520 | B2 | 7/2010 | Fuziak, Jr. |
| 7,760,898 | B2 | 7/2010 | Howell et al. |
| 7,798,638 | B2 | 9/2010 | Fuziak, Jr. |
| 7,806,525 | B2 | 10/2010 | Howell et al. |
| 7,918,556 | B2 | 4/2011 | Lewis |
| 7,959,084 | B2 | 6/2011 | Wulff |
| 7,966,189 | B2 | 6/2011 | Le et al. |
| 7,967,433 | B2 | 6/2011 | Jannard et al. |
| 7,969,383 | B2 | 6/2011 | Eberl et al. |
| 7,969,657 | B2 | 6/2011 | Cakmakci et al. |
| 7,976,480 | B2 | 7/2011 | Grajales et al. |
| 7,988,283 | B2 | 8/2011 | Jannard |
| 7,997,723 | B2 | 8/2011 | Pienimaa et al. |
| 8,010,156 | B2 | 8/2011 | Warren |
| 8,020,989 | B2 | 9/2011 | Jannard et al. |
| 8,025,398 | B2 | 9/2011 | Jannard |
| 8,072,393 | B2 | 12/2011 | Riechel |
| 8,092,011 | B2 | 1/2012 | Sugihara et al. |
| 8,098,439 | B2 | 1/2012 | Amitai et al. |
| 8,123,352 | B2 | 2/2012 | Matsumoto et al. |
| 8,140,197 | B2 | 3/2012 | Lapidot et al. |
| 8,212,859 | B2 | 7/2012 | Tang et al. |
| 8,327,295 | B2 | 12/2012 | Ikeda |
| 9,235,262 | B2 | 1/2016 | Jacobsen et al. |
| 9,316,827 | B2 * | 4/2016 | Lindley |
| 2001/0003712 | A1 | 6/2001 | Roclofs |
| 2001/0035845 | A1 | 11/2001 | Zwern |
| 2002/0015008 | A1 | 2/2002 | Kishida et al. |
| 2002/0094845 | A1 | 7/2002 | Inasaka |
| 2002/0158815 | A1 | 10/2002 | Zwern |
| 2003/0020755 | A1 | 1/2003 | Lemelson |
| 2003/0046401 | A1 | 3/2003 | Abbott et al. |
| 2003/0068057 | A1 | 4/2003 | Miller et al. |
| 2003/0222917 | A1 | 12/2003 | Trantow |
| 2004/0267527 | A1 | 12/2004 | Creamer et al. |
| 2005/0047629 | A1 | 3/2005 | Farrell et al. |
| 2005/0264527 | A1 | 12/2005 | Lin |
| 2006/0132382 | A1 | 6/2006 | Jannard |
| 2007/0220108 | A1 | 9/2007 | Whitaker |
| 2008/0052643 | A1 | 2/2008 | Ike et al. |
| 2008/0198324 | A1 | 8/2008 | Fuziak |
| 2008/0309626 | A1 | 12/2008 | Westerman |
| 2009/0128448 | A1 | 5/2009 | Riechel |
| 2009/0154719 | A1 | 6/2009 | Wulff et al. |
| 2009/0180195 | A1 | 7/2009 | Cakmakci et al. |
| 2009/0182562 | A1 | 7/2009 | Caire et al. |
| 2009/0213071 | A1 | 8/2009 | Wang et al. |
| 2010/0020229 | A1 | 1/2010 | Hershey et al. |
| 2010/0033830 | A1 | 2/2010 | Yung |
| 2010/0053069 | A1 | 3/2010 | Tricoukes et al. |
| 2010/0121480 | A1 | 5/2010 | Stelzer et al. |
| 2010/0171680 | A1 | 7/2010 | Lapidot et al. |
| 2010/0225734 | A1 | 9/2010 | Weller et al. |
| 2010/0238184 | A1 | 9/2010 | Janicki |
| 2010/0259471 | A1 | 10/2010 | Takano et al. |
| 2010/0271587 | A1 | 10/2010 | Pavlopoulos |
| 2010/0277563 | A1 | 11/2010 | Gupta et al. |
| 2010/0289817 | A1 | 11/2010 | Meier et al. |
| 2010/0325575 | A1 | 12/2010 | Platzer |
| 2011/0001699 | A1 | 1/2011 | Jacobsen et al. |
| 2011/0089207 | A1 | 4/2011 | Tricoukes et al. |
| 2011/0090135 | A1 | 4/2011 | Tricoukes et al. |
| 2011/0214082 | A1 | 9/2011 | Osterhout et al. |
| 2011/0221656 | A1 | 9/2011 | Haddick et al. |
| 2011/0221669 | A1 | 9/2011 | Shams et al. |
| 2011/0221671 | A1 | 9/2011 | King, III et al. |
| 2011/0227812 | A1 | 9/2011 | Haddick et al. |
| 2011/0227813 | A1 | 9/2011 | Haddick et al. |
| 2011/0254698 | A1 | 10/2011 | Eberl et al. |
| 2011/0255050 | A1 | 10/2011 | Jannard et al. |
| 2011/0273662 | A1 | 11/2011 | Hwang et al. |
| 2012/0013843 | A1 | 1/2012 | Jannard |
| 2012/0026071 | A1 | 2/2012 | Hamdani et al. |
| 2012/0056846 | A1 | 3/2012 | Zaliva |
| 2012/0062444 | A1 | 3/2012 | Cok et al. |
| 2012/0062445 | A1 | 3/2012 | Haddick et al. |
| 2012/0068914 | A1 | 3/2012 | Jacobsen |
| 2012/0105740 | A1 | 5/2012 | Jannard et al. |
| 2012/0110456 | A1 | 5/2012 | Larco et al. |
| 2012/0114131 | A1 | 5/2012 | Tricoukes et al. |
| 2012/0188148 | A1 | 7/2012 | DeJong |
| 2012/0188245 | A1 | 7/2012 | Hyatt |
| 2012/0236025 | A1 * | 9/2012 | Jacobsen ................. G06F 3/011 345/629 |
| 2013/0231937 | A1 | 9/2013 | Woodall et al. |
| 2013/0239000 | A1 | 9/2013 | Parkinson et al. |

(56) References Cited

U.S. PATENT DOCUMENTS

| | | |
|---|---|---|
| 2014/0191964 A1 | 7/2014 | McDonald et al. |
| 2014/0223299 A1 | 8/2014 | Han |
| 2015/0220142 A1 | 8/2015 | Parkinson et al. |

FOREIGN PATENT DOCUMENTS

| | | |
|---|---|---|
| CN | 101620511 A | 1/2010 |
| JP | 2001-100878 A | 4/2001 |
| JP | 2001-506389 A | 5/2001 |
| JP | 2001-216069 A | 8/2001 |
| JP | 2002-525769 A | 8/2002 |
| JP | 2003-241880 A | 8/2003 |
| JP | 2004-233117 A | 8/2004 |
| JP | 2008-052590 A | 3/2008 |
| JP | 2011-511935 A | 7/2009 |
| JP | 2009-179062 A | 8/2009 |
| WO | WO 95/21408 | 8/1995 |
| WO | WO 95/23994 | 9/1995 |
| WO | WO 99/01838 | 1/1999 |
| WO | WO 00/17848 | 3/2000 |
| WO | WO 00/79327 | 12/2000 |
| WO | WO 2009/076016 | 6/2009 |
| WO | WO 2009/091639 | 7/2009 |
| WO | WO 2010/129679 A1 | 11/2010 |
| WO | WO 2011/051660 | 5/2011 |
| WO | WO 2011/097226 A1 | 8/2011 |
| WO | WO 2012/040107 A1 | 3/2012 |
| WO | WO 2012/040386 | 3/2012 |
| WO | WO 2012/154938 A1 | 11/2012 |
| WO | WO 2013/180966 A1 | 12/2013 |

OTHER PUBLICATIONS

Notification of Transmittal of the International Search Report and Written Opinion for PCT/US2013/041070, "Controlled Headset Computer Displays," dated Oct. 18, 2013.

Notification of Transmittal of the International Search Report and Written Opinion for PCT/US2013/041349, "Head-Worn Computer With Improved Virtual Display Function," dated Aug. 9, 2013.

Notification of Transmittal of the International Search Report and Written Opinion for PCT/US2011/052164, "Advanced Remote Control of Host Application Using Motion and Voice Commands," dated Jan. 17, 2012.

Notification Concerning Transmittal of International Preliminary Report on Patentablility and Written Opinion of the International Searching Authority, "A Headset Computer With Head Tracking Input Used for Inertial Control," PCT/US2013/066071, dated Jul. 16, 2015.

International Preliminary Report on Patentability for PCT/US2013/078051, dated Jul. 7, 2015 entitled; "Lifeboard—Series of Home Pages for Head Mounted Displays (HMD) That Respond to Head Tracking".

Notification of Transmittal of International Search Report and Written Opinion of PCT/US2013/066071 dated Feb. 27, 2014, entitled "A Headset Computer With Head Tracking Input Used for Inertial Control".

\* cited by examiner

HEAD MOVEMENT CONTROLLED NAVIGATION AMONG MULTIPLE BOARDS FOR DISPLAY IN A HEADSET COMPUTER

RELATED APPLICATION(S)

This application is a continuation of U.S. application Ser. No. 14/142,272, filed Dec. 27, 2013, which claims the benefit of U.S. Provisional Application No. 61/748,757, filed on Jan. 4, 2013. The parent application (Ser. No. 14/142,272) is also a continuation-in-part of U.S. application Ser. No. 13/234,916, filed Sep. 16, 2011, which claims the benefit of U.S. Provisional Application No. 61/384,586, filed on Sep. 20, 2010.

The entire teachings of the above application(s) are incorporated herein by reference.

BACKGROUND OF THE INVENTION

Mobile computing devices, such as notebook PC's, smart phones, and tablet computing devices, are now common tools used for producing, analyzing, communicating, and consuming data in both business and personal life. Consumers continue to embrace a mobile digital lifestyle as the ease of access to digital information increases with high-speed wireless communications technologies becoming ubiquitous. Popular uses of mobile computing devices include displaying large amounts of high-resolution computer graphics information and video content, often wirelessly streamed to the device. While these devices typically include a display screen, the preferred visual experience of a high-resolution, large format display cannot be easily replicated in such mobile devices because the physical size of such device is limited to promote mobility. Another drawback of the aforementioned device types is that the user interface is hands-dependent, typically requiring a user to enter data or make selections using a keyboard (physical or virtual) or touch-screen display. As a result, consumers are now seeking a hands-free high-quality, portable, color display solution to augment or replace their hands-dependent mobile devices.

SUMMARY OF THE INVENTION

Recently developed micro-displays can provide large-format, high-resolution color pictures and streaming video in a very small form factor. One application for such displays can be integrated into a wireless headset computer worn on the head of the user with a display within the field of view of the user, similar in format to eyeglasses, audio headset or video eyewear. A "wireless computing headset" device includes one or more small high-resolution micro-displays and optics to magnify the image. The WVGA microdisplays can provide super video graphics array (SVGA) (800×600) resolution or extended graphic arrays (XGA) (1024×768) or even higher resolutions. A wireless computing headset contains one or more wireless computing and communication interfaces, enabling data and streaming video capability, and provides greater convenience and mobility through hands dependent devices. For more information concerning such devices, see co-pending patent applications entitled "Mobile Wireless Display Software Platform for Controlling Other Systems and Devices," U.S. application Ser. No. 12/348,648 filed Jan. 5, 2009, "Handheld Wireless Display Devices Having High Resolution Display Suitable For Use as a Mobile Internet Device," PCT International Application No. PCT/US09/38601 filed Mar. 27, 2009, and "Improved Headset Computer," U.S. Application No. 61/638,419 filed Apr. 25, 2012, each of which are incorporated herein by reference in their entirety.

In some aspects, the invention relates to providing a new approach to the home page experience of Head Mounted Displays (HMD). Aspects of the invention allow the user to create a series of user configurable pages, or boards, that respond to head tracking and that the user can navigate through. The user can, for example, zoom out of each board to view a series of boards that respond to gesture control, enabling the user to easily switch between boards. Other aspects of the present invention relate to the user having a series of user configurable Home Pages that contain the shortcuts and widgets the user wants (for example, most often used ones). This allows the user to design an environment that gives him the information she wants, in the order she wants, allows the user to create a dashboard of information relevant to her. Each panel may present a summary of the full application.

A preferred embodiment of the present invention is directed at a navigation and control method in a headset computer comprising (a) displaying at the headset computer a user interface formed of a series of board-like pages, wherein content of a page is representative of a functional application; and (b) receiving at the headset computer user input in the form of head movements, and in response, the headset computer operates the displayed user interface including navigating about the pages and operating the applications. Other embodiments are directed to the method described above in this paragraph wherein (a) the user input includes voice commands; (b) the series is user configurable; (c) the contents of each page are user configurable; (d) the display by the headset computer effectively enables speech and handsfree user interaction; (e) the content of the board-like pages includes user selected shortcuts and operative widgets, and the content is user positioned on the page; (f) the content of the board-like pages includes user selected shortcuts and operative widgets, and the headset computer utilizes speech recognition and head tracking to interpret the voice commands and head movements in operating the user interface; or (g) the content of the board-like pages includes user selected shortcuts and operative widgets, the headset computer utilizes speech recognition and head tracking to interpret the voice commands and head movements in operating the user interface, and the contents of each page are user configured.

In a preferred embodiment, the invention relates to a navigation and control method in a headset computer comprising (a) displaying at the headset computer a first field of view within a virtual display area; (b) receiving at the headset computer user input in the form of head movements; and (c) displaying at the headset computer in response to the user input a second field of view within the virtual display area. Other embodiments relate to the method described above in this paragraph wherein (a) the content of the first field of view is a board-like page; (b) the content of the first field of view is a board-like page, and the content of the second field of view is a board-like page; (c) the content of the first field of view is a board-like page, the content of the second field of view is a board-like page, and at least one of the board-like page in the first field of view and the board-like page in the second field of view has content that is user-configurable; or (e) the content of the first field of view is a board-like page, the content of the second field of view is a board-like page, at least one of the board-like page in the first field of view and the board-like page in the second field of view has content that is user-configurable, and the content that is user-configurable is chosen from the group consisting of widgets and applications.

In a preferred embodiment the invention relates to a headset computer system comprising (a) a processor; (b) a microdisplay; and (c) a user interface configured to display via the microdisplay a first field of view within a virtual display; to receive user input in the form of head movements; and in response to the user input to display a second field of view within the virtual display area. Other embodiments relate to the system described above in this paragraph wherein at least one of the first field of view and the second field of view has content that is user configured, said user configured content comprising widgets and applications.

In a preferred embodiment the invention relates to a headset computer system comprising (a) a processor; (b) a microdisplay; and (c) a user interface configured to display via the microdisplay a series of board-like pages, wherein content of a page is representative of a functional application; to receive user input in the form of head movements; and in response to the user input to perform at least one of the actions chosen from the group consisting of navigating about the pages and opening applications. Other embodiments relate to the system described above in this paragraph (a) wherein the content of the board-like pages includes user selected shortcuts and operative widgets; (b) further comprising a speech recognition engine configured to receive user input in the form of voice commands, the processor in response to said voice commands being configured to perform the at least one of the actions chosen from the group consisting of navigating about the pages and opening applications; or (c) further comprising a speech recognition engine configured to receive user input in the form of voice commands, the processor in response to said voice commands being configured to perform the at least one of the actions chosen from the group consisting of navigating about the pages and opening applications, and wherein the content is user positioned on the page.

BRIEF DESCRIPTION OF DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1A:
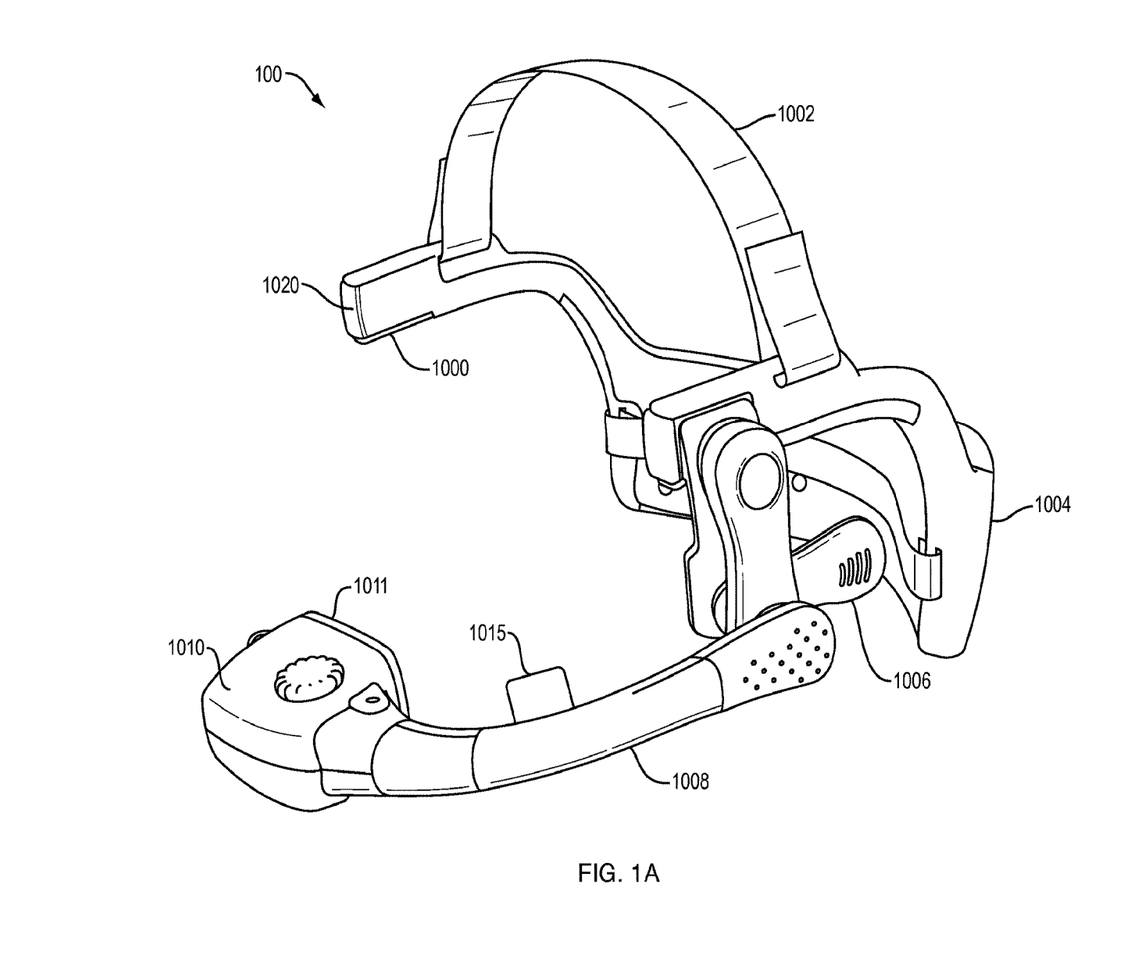
FIG. 1A is a schematic illustration of a headset computer according to principles of the present invention.

FIG. 1A is a perspective view showing some details of an example embodiment of a wireless computing headset device 100 (also referred to herein as a headset computer (HSC) or head mounted display (HMD)) that incorporates a high-resolution (VGA or better) microdisplay element 1010 and other features described below. The example embodiment HSC 100 includes a head worn frame 1000 and strap 1002 configured so that a user can wear the headset computer device 100 on the user's head. A housing 1004 houses various electronic components and circuits including, without limitation, a microprocessor or microcomputer (single or multicore processors), one or more wired and/or wireless communications interfaces, one or more memory or storage devices, and other associated circuitry, various sensors, and a peripheral mount or mount. Housing 1004 is generally a low profile unit although it does not need to be.

Speakers 1006 provide audio output to the user so that the user can hear information. Microdisplay subassembly 1010, which can include a display element 1011, is used to render visual information to the user. Display element 1010 is coupled to arm 1008, which is alternately referred to as a cantilever or boom. The arm 1008 generally provides physical support such that the microdisplay subassembly is able to be positioned within the user's field of view, preferably in front of the eye of the user or within his peripheral vision preferably slightly below or above the eye. Arm 1008 also provides the electrical or optical connections between the microdisplay subassembly 1010, and the control circuitry housed within housing unit 1004. Microphone 1015 is also coupled to the arm 1008.

The peripheral port 1020 provides connections to one or more peripheral devices, so that a user can removably attach various accessories to the device 100. For example, port 1020 can provide a mechanical and electrical accessory mount such as a hot shoe. Wiring carries electrical signals from port 1020 through, for example, the back portion 1004 to circuitry disposed therein. Hot shoe 1020 can operate much like the hot shoe on a camera, automatically providing connections to power the accessory and carry signals to and from the rest of device 100. Various types of accessories can thus be used with port 1020 to provide the hand movements, head movements, and or vocal inputs to the system, such as but not limited to microphones, positional, orientation and other previously described sensors, cameras, and the like.

Whether via port 1020 or otherwise, HSC 100 can include or accommodate a wide variety of devices, including without limitation audio input and/or output devices; one or more microphones; input and output speakers; geo-positional sensors (GPS); three to nine axis degrees of freedom orientation sensors; atmospheric sensors; health condition sensors; digital compass; pressure sensors; environmental sensors; energy sensors; acceleration sensors; position, attitude, motion, velocity and/or optical sensors; cameras (visible light, infrared, etc.); one or more wireless radios; auxiliary lighting; rangefinders or the like; and/or an array of sensors embedded and/or integrated into the headset and/or attached to the device via one or more peripheral ports (not shown in detail in FIG. 1A).

Figure 1B:
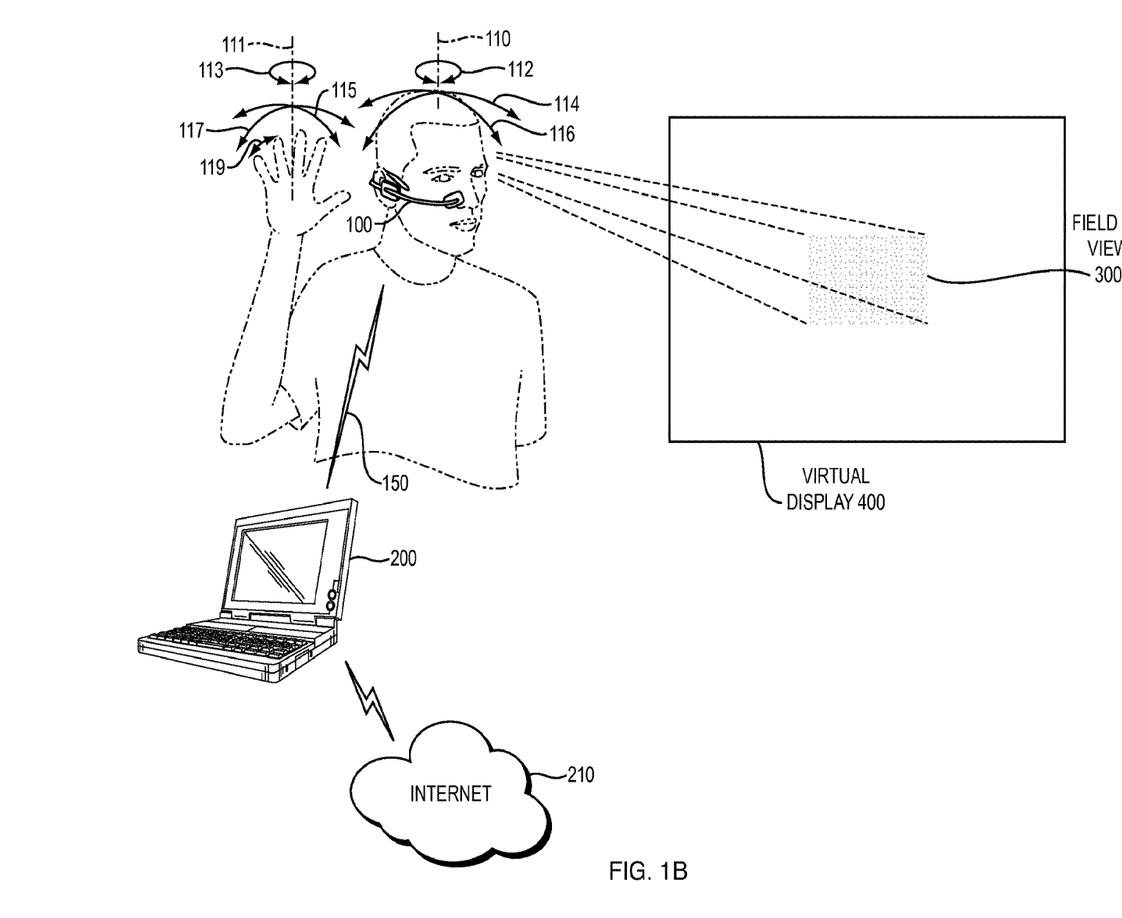
FIG. 1B is a schematic illustration of a headset computer cooperating with a host computer (e.g., Smart Phone, laptop, etc.) according to principles of the present invention.

FIG. 1B depicts additional features and aspects of HSC 100 according to aspects of the present invention, including aspects relating to kinematic or body-positional input, such as head or hand motion. HSC 100 can, for example, detect a wide range of head movements, including head rotation 112 about the cervical axis 110, lateral head movement 114, i.e., abduction or adduction, and head flexion/extension 116. Likewise, HSC 100 can detect a wide range of hand movements or gestures, including axial rotation 113 of the hand about wrist axis 111, pronation/supination 115, radial/ulnar deviation 117, and digital motions, such as abduction/adduction 119 of the phalanges, or any combination of the foregoing. In embodiments, gyroscopes, accelerometers, and other micro-electromechanical system sensors can be integrated into and used to track the user's head movements to provide user input commands. Cameras or other motion tracking sensors can be used to monitor a user's hand gestures for user input commands. Such a user interface overcomes the hands-dependent formats of other mobile devices.

HSC 100 can be connected directed or indirectly to additional devices, such as remote host computing device 200 (shown in FIG. 1A). The host 200 may be, for example, a notebook PC, smart phone, tablet device, or other computing device having less or greater computational complexity than the wireless computing headset device 100, such as cloud-based network resources. The host may be further connected to other networks, such as the Internet 210. The headset computing device 100 and host 200 can wirelessly communicate via one or more wireless protocols, such as Bluetooth®, Wi-Fi, WiMAX, 4G LTE or other wireless radio link 150. (Bluetooth is a registered trademark of Bluetooth Sig, Inc. of 5209 Lake Washington Boulevard, Kirkland, Wash. 98033.) In an example embodiment, the host 200 may be further connected to other networks, such as through a wireless connection to the Internet or other cloud-based network resources, so that the host 200 can act as a wireless relay. Alternatively, some example embodiments of the HSC 100 can wirelessly connect to the Internet and cloud-based network resources without the use of a host wireless relay. In embodiments, HSC 100 is used as a remote display for streaming video signals received from a host 200.

In one embodiment, the HSC or HMD 100 may take the form of the head worn computing device described in a co-pending US Patent Publication Number 2011/0187640 which is hereby incorporated by reference in its entirety.

According to aspects that will be explained in more detail below, HSC 100 allows a user to select a field of view 300 within a much larger area defined by a virtual display 400. The user can typically control the position, extent (e.g., X-Y or 3D range), and/or magnification of the field of view 300. Factors that define the native field of view for a given HSC 100 are well known to those of skill in the art and include the size of the display, distance to the pupil of the user's eye, pixel density, and supported resolution. There is also the limit of resolution of the human eye itself, which is well known, and often expressed in arctuate pixel density, wherein distance to the eye is itself a factor.

In head mounted devices, it can be desirable to limit both distance to the eye and display size. A display placed too close to the eye will impede the user's visions. A display that is too large will likewise block vision, and a large display is also likely to be heavy. A heavy display, especially when cantilevered at the end of a boom, can produce enough torque to be uncomfortable to the neck musculature of the user, particularly when the headset is worn for extended periods.

At the same time, users of head mounted devices desire both adequate resolution and the ability to access a sufficient area of information on a visual display. In part, these user expectations are driven by the steady progression in size and quality of computer displays employed in typical desktop environments. Users have come to expect large screen, high resolution monitors. Evidence of this is the constant progression in the consumer segment towards displays of ever larger dimension and resolution. User expectations of a head mounted display are also driven by the contextual demands of the wearer. Head mounted displays are used in situations where the area or resolution of the display, or both, are critical. Consider, for example, a paramedic or doctor wearing a head mounted display and making diagnoses or treatment decisions based on images being displayed thereon. The resolution of these images is critical. Consider, in the alternative, a soldier wearing a HSC on the battlefield and needing access to topographical maps of a large area in order to plan a detailed route of approach to a target. The ability to see the entire map, the entire relevant area, is mission critical.

As shown by reference to the figures and described embodiments, aspects of the present invention address these challenges by providing, inter alia, head motion functionality to pan, zoom, and adjust the field of view within a virtual display area of a head mounted display. In this regard, the invention provides a solution to a fundamental design challenge that has existed since headset displays were first developed, namely how to provide the best quality, largest visual information displays given the constraints that they must be worn on the head in proximity to the user's eye.

What the inventors have discovered, not heretofore appreciated, is the use of, and the advantages associated with the use of, a head-controlled virtual display environment to navigate a head mounted display. Because users seek head mounted devices in part so that the devices can be carried and operated in a hands-free manner, such devices are designed to be controlled by a number of input modalities, including voice, head, hand, body input. Accordingly, the use of head motion to control panning and zooming functions does not interfere with the simultaneous input of other commands, such as voice commands. This is in contrast to the situation with desktop computers, which are typically operated almost exclusively by a single input modality, the hands, such as by manipulation of a mouse or by typing on a keyboard. Implementation of a virtual desktop environment in a traditional personal computer environment would accordingly require the user to be distracted from the use of the hands for other command or data inputs, in order to manipulate a scroll bar or other widget element in order to pan or zoom. Accordingly, implementation of a head motion-navigable virtual display environment in connection with a head mounted physical display overcomes shortcomings of the prior art not heretofore addressed.

While what is shown in FIGS. 1A and 1B is a monocular microdisplay presenting a single fixed display element supported on the face of the user with a cantilevered boom, it should be understood that other mechanical configurations for the HSC or HMD device 100 are possible. In some embodiments, HSC or HMD 100 is a remote control display device. In some embodiments, two microdisplays can be used, which has the advantage of more readily providing for binocular vision. A variety of optics or optical processing circuitry can be used in connection with the delivery of images to microdisplays, or with the perception of images on the microdisplays, including collimators. Some of these optics or circuitry can control the perceived position of the image relative to the users' eyes. A variety of displays can be used, including LCD displays. The attachment of the display to HSC can also be achieved in a variety of ways.

Figure 2:
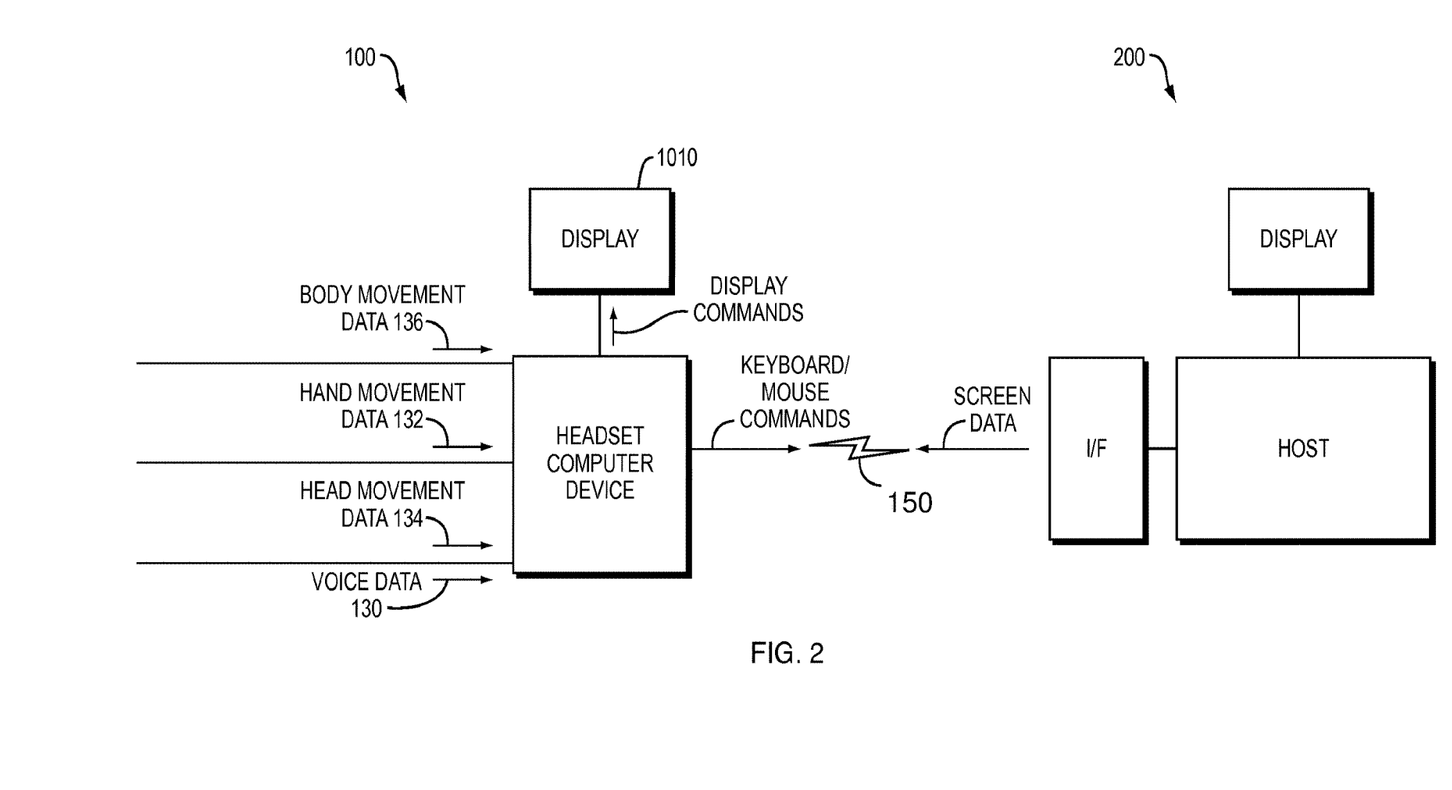
FIG. 2 is a block diagram of flow of data and control in the embodiment of FIGS. 1A and 1B.

FIG. 2 is a block diagram showing more detail of HSC 100, host 200 and the data that travels between them. HSC 100 receives a variety of inputs, which can be used to control or operate the device is a hands-free manner. These inputs include voice data 130, which can be received via a microphone; hand movement data 132 and body gestures/body movement data 136, which can be received via positional and orientation sensors and the camera or optical sensor(s); and head movement data 134, which can be received, for example, via head tracking circuitry such as 3 axis to 9 axis degrees of freedom orientational sensing system.

Software in the HSC or HMD device 100 translates these inputs into keyboard and/or mouse commands. These translated inputs can then be acted upon, for example, by software running in HSC 100, or in the alternative, sent over the Bluetooth or other wireless interface 150 to the host 200, whereupon the host 200 then interprets these translated commands in accordance with its own operating system/application software to perform various functions. In some embodiments, the Head Mounted Display device 100 is used in conjunction a host 200 that is an external 'smart' device 200 (such as a smartphone or tablet) so as to provide information and control to the user hands-free. Preferably, this conjunctive use requires the transmission of only small amounts of data 150, in order to provide a more reliable data transfer method running in real-time. Transmitted data 150 can include, for example, instructions on how to lay out a screen, which text to display, and other stylistic information such as drawing arrows, or the background colors, images to include, etc. Additional data could be streamed over the same 150 or another connection and displayed on screen 1010, such as a video stream if required by the controller host 200.

Among the commands that can be executed by HSC 100 in response to various inputs are commands to select a field of view 300 within the virtual display 400 and display the selected field of view on display element screen 1011. Where host 200 is providing data for or otherwise controlling the display, then the input commands would result in selected screen data being displayed on display element 1011. Even though a very large format virtual display area 400 might be associated with application software or an operating system running on the host 200, only the portion of that large virtual display area that is within field of view 300 is returned to and actually displayed by the micro display 1010 of HSC or HMD device 100.

Control of field of view 300 or the selection and display of material within field of view 300 can be accomplished in a variety of ways, including by voice, hand gestures, or head or body motion commands, or some combination thereof.

In some aspects, the user can instruct the device 100 to move the field of view 300 in a variety of ways, including panning left, right, up, and down, and zooming in and out within virtual display area 400. This control can be achieved by a variety of user inputs, or combinations or inputs, including body movements, hand movements, head movements, or voice input. Optionally, a combination of movements or gestures, either of the same kind, or of different kinds can be used. In one embodiment, for example, a user can rotate his head to the left to pan left the field of view 300 within virtual display area 400, rotate his head to the right to pan right, and so on. The panning can be implemented in a variety of ways. For example, it may be smooth and continuous, such that, for example, when the edge of the current field of view is reached, the field pans steadily while the user continues to look left. In the alternative, when the left edge, for example, of the current field of view is reached, the user display jumps to the next screen to the left, with the field of view being replaced with the next lateral field.

For example, the virtual display area 400 could include a detailed map of the United States. A user may initially see the entire United States area on the microdisplay, albeit at reduced resolution. If the virtual display area is limited to the United States, then the field of view 300 will coincide with the virtual display area 400. In the alternative, if the virtual display area includes maps of both the United States and, say, Canada, then a field of view showing only the United States is less the virtual display area. In the later case, the user can zoom out of a view showing only the United States until both the United States and Canada are visible and the field of view 300 is congruent with the virtual display area 400.

The size of the field of view and its position, e.g., the x-y coordinates for the center of the field in the virtual display grid, can be adjusted by the user. The size of the field of view can be adjusted by zooming in or out, and the position of the field of field can be adjusted by panning, such as by panning left and right, or up and down.

As an example showing both zooming and panning functionality, consider a field of view that is centered at a low magnification on a central location, such as at Lawrence, Kans. The user then moves his head or makes a hand gesture to view an area of specific interest in some detail such as Seattle, Wash. The hand gesture might be, for example, a diagonal sweeping motion. The head movement might be, for example, a rotation of the head to the left and then up or may be a straight diagonal movement over to the new area of interest. With such a head command, or a vocal command such as "zoom in," the presented virtual display area is then zoomed in to render images of the area around Seattle in more detail on the microdisplay.

A variety of head movements can be used to control the pan and zoom functions related to the implementation of a virtual display area 400 that exceeds the dimensions of the field of view available to the user of HSC 100. In some embodiments, the system allows the user to create a series of pages that correspond to a plurality of different fields of view 300 within the virtual display 400. For example, the virtual display could be divided into four regions, and the user can navigate between them, such as by panning, or by zooming out and then selecting a given field of view. A preferred embodiment allows the user to create a series of user configurable pages, or boards, that respond to head tracking and that the user can navigate through. The user can zoom out of each board to view a series of boards that respond to gesture control, enabling the user to easily switch between boards.

With embodiments of the present invention, the user has a series of user configurable Home Pages that contain the shortcuts and widgets the user wants. This allows the user to design an environment that gives him the information he wants, in the order he wants. Some embodiments of the present invention comprise up to six boards (screen view pages) presenting user configurable content to the user. In these embodiments, effectively the user can have up to six different boards. The user can have a wide variety of numbers of boards, including greater than six. In embodiments, each board responds to head tracking. This head tracking can allow the user to operate within a board and to move between boards.

Embodiments can respond to head tracking in a variety of ways. In some embodiments, the response is not on a 1:1 basis. Nonetheless, the response can still be smoothly responsive. For example, the response to deviation of the head from a given starting position could be nonlinear, either responding more or less rapidly with additional incremental deviations from a rest position.

In other aspects, the invention relates not just to a continuous pan or zoom, but to incremental implementation of panning or zoom. For example, the virtual display area could be divided (partitioned) into a number of boxed areas. Rather than head motion translating into a smooth change in position of the field of view within the virtual display area, the head motion could translate into a jump from one boxed area to the next. In this manner, the user could jump from one window to the next, all under head control. The segmentation of the virtual display areas into boxed areas or windows can allow not only tracking of the field of view into discrete windows, but can also provide the ability to cleanly differentiate the windows as discrete work environments. For example, in embodiments, certain applications or features can be visible only when the user is in a particular field of view. Other applications, images, processes or other attributes can be constant or otherwise present across one or more such windows.

For example, a virtual area could be a map of a user's home town, complete with images or indications of the user's favorite supermarket, home, and place of work. The virtual area is further divided (partitioned) into four boxes, or windows. When the user has selected, or chosen to work within, the upper right box (e.g., a cursor or display pointer is positioned within that box, the box is an active box, or the focal point of the display view is at, on, or within that box), then the northeast portion of the hometown map is visible, with a dot indicating where the user works. The user's work appointment calendar is also visible, along with a set of work related widgets, such as a calculator, telephone, stock market tracker, and so on. The user pans the cursor/selected area/focus point/display pointer to the bottom right quadrant by moving his head down, for example. The map application is still running and visible, but now displays a different portion of the map, including the area depicting the user's home address. The work related widgets are no longer visible, but HSC 100 makes other icons of home-related applications and widgets appear, such as video games, video browser, and a family photo book application.

In yet other embodiments, the partitioned/boxed areas or windows additionally replicate aspects of the home page of an application of the desktop of an operating system. This allows for the user to customize one or more of these windows with desired widgets, applications, or other elements, while still maintaining familiar aspects of the functionality provided by design aspects of home pages or other common elements of well known graphical user interfaces.

Figure 3:
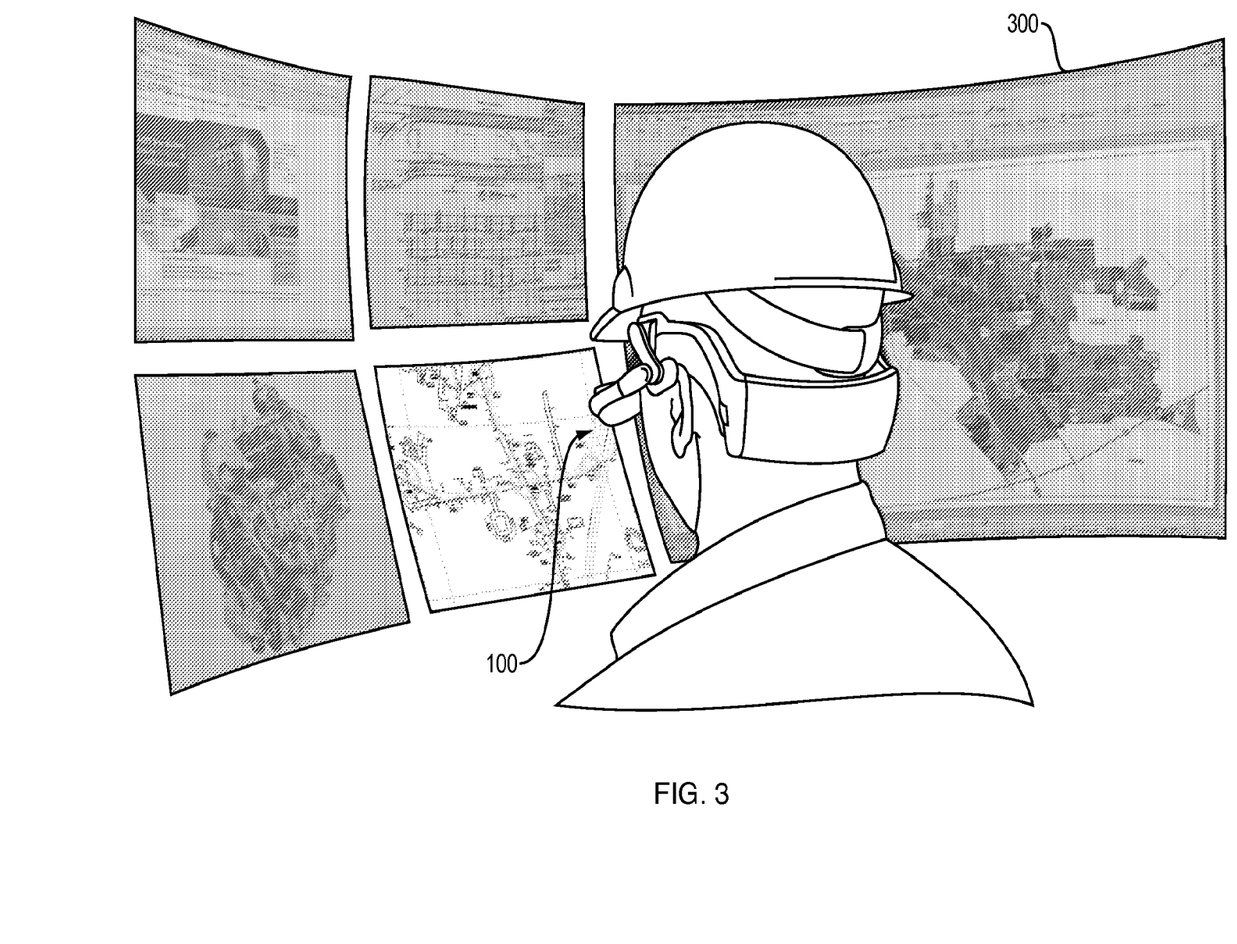
FIG. 3 is a schematic illustration of an operator wearing a headset computer, further illustrating the visual content available to the user, depicted as multiple windows within a virtual display area of the present invention.

FIG. 3 depicts a user wearing HSC 100 and receiving visual input therefrom in the form of a plurality of boards 300 displayed on microdisplay 1010. In preferred embodiments, the invention relates to a user interface formed of a series of such boards, which can include, without limitation, partitioned/boxed areas, windows, and customizable home pages. These boards can be navigated within or between, or both, using head motion commands. In one implementation, each board is slightly wider than the display 1010 (display element 1011), so when the user pans left and reaches the edge of the board, a button appears (displays) inviting the user to 'Navigate Left' if a page to the left exists. For example, the HMD Screen size is chosen to be 600×800 pixels and the boards are sized 600×840 pixels. The board, forming one of a series of boards, then provides additional functionality to the user. If the user turns his head to the left or right edges of the board (moving a sufficient degree in either direction), the board 'nudges' in at the side the user is facing, showing (displaying or otherwise illuminating) a button inviting the user to navigate left or right to the previous or next board. Multiple desktop screens can be configured within the operating system executing on HSC 100 or host 200 and navigated using head-movement and/or speech commands. Each desktop can be configured to run a different application at the same time. For example, a first desktop can be used to run the photo-viewing application which consumes the entire screen (display element 1011). To watch a movie, the user can issue a 'new desktop' spoken command and then select a movie viewing application from the new desktop. This then allows the movie viewing to take place in the current window. However the photo viewing application is still running but not visible. The user can switch to the photo viewing application by issuing a suitable command to switch viewable desktops ("Go to desktop 1"), or move around the open desktops by moving the head left, right, up, or down. The user is therefore able to quickly navigate among/between and glance at all open desktops and their running applications.

In the implementation shown in FIG. 3, head tracking and/or voice inputs can be used to operate multiple desktops and/or running-applications. The user can also "Zoom Out", using voice command, to see the boards in a cinemascope view. The system 100 then moves the boards in and out of the central position based on head-tracking movement until the user zooms in again. It should be more generally emphasized that aspects of the invention relate not only to the user's head motions, but also body motion, hand, motion, and voice commands to control motion within or between boards. In the Voice Controlled environment of the HMD 100 commands could include: Navigate Left, Navigate Right, Zoom.

In any of the foregoing embodiments, to gain an overview of all the boards, the user can issue the command 'Zoom Out' and the HMD/HSC responsively presents an overview to the user via microdisplay 1010. Alternatively the user could issue a command with his head or with his hand or body to control the degree of zoom. With respect to devices operating board embodiments of the invention, the zoom functionality can be implemented such that when zoomed out sufficiently the user can see multiple boards.

Figure 4:
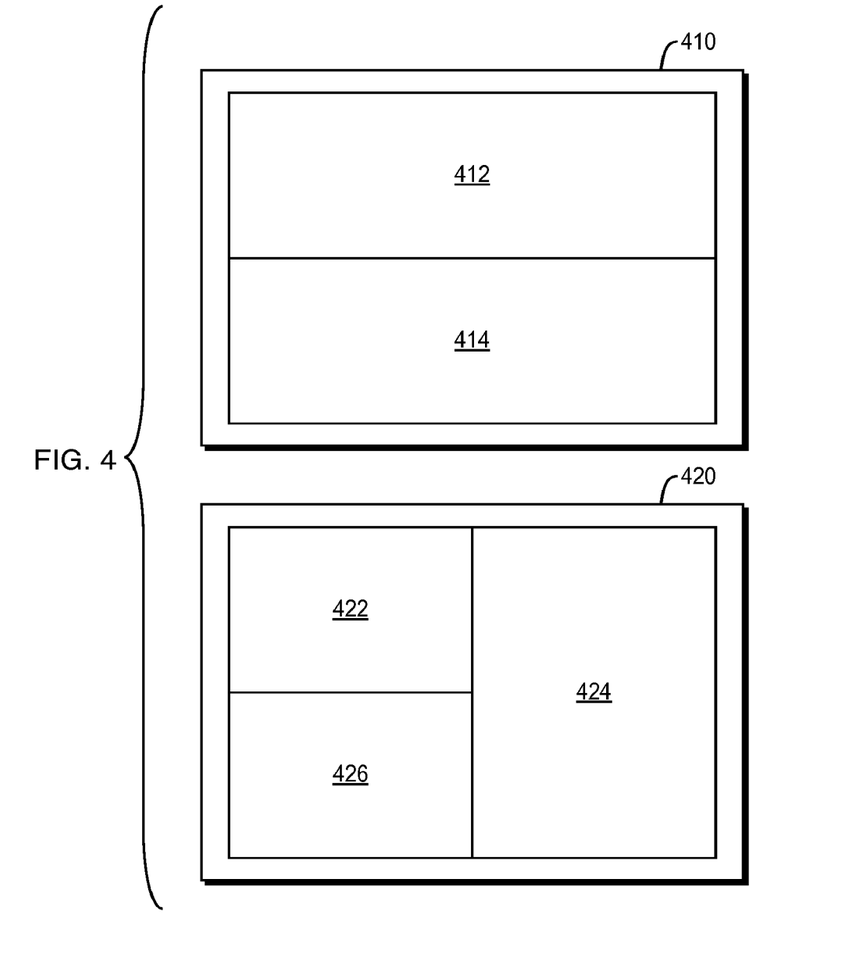
FIG. 4 is a depiction of boards of the present invention, showing boxed areas.

In embodiments, the 'boards' of the present invention are made up of a series of grid templates. FIG. 4 depicts two such board templates, 410 and 420. Each board template allows widgets to be placed in certain panels (spaces or areas). For example, two templates may be as follows. For example, template 410 has two widget panels 412, 414, one on the top level and one on the bottom; template 420 has two widget left hand side panels 422, 426, and one taller panel 424 to the right hand side.

The board templates can be defined in the system 100, and made available to the user. When the user adds a new board (through voice command or other means), he selects a template for his board. He might select a board that only allows one large widget, or perhaps a board that allows four or five smaller widgets to be placed.

The user then has to select the widgets he wishes to anchor to the board. A widget is an application providing any form of functionality (such as a clock, email, calendar, etc.) that can be placed by the user within the board. Each 'widget' can be resized to any position space on a board, except where the widget is restricted to certain panel sizes. The user selects the widget he wishes to place (using voice command or other means); then, using the head-tracker, the user chooses the panel he wishes to fill (anchoring the widget using voice command or other means).

Figure 5:
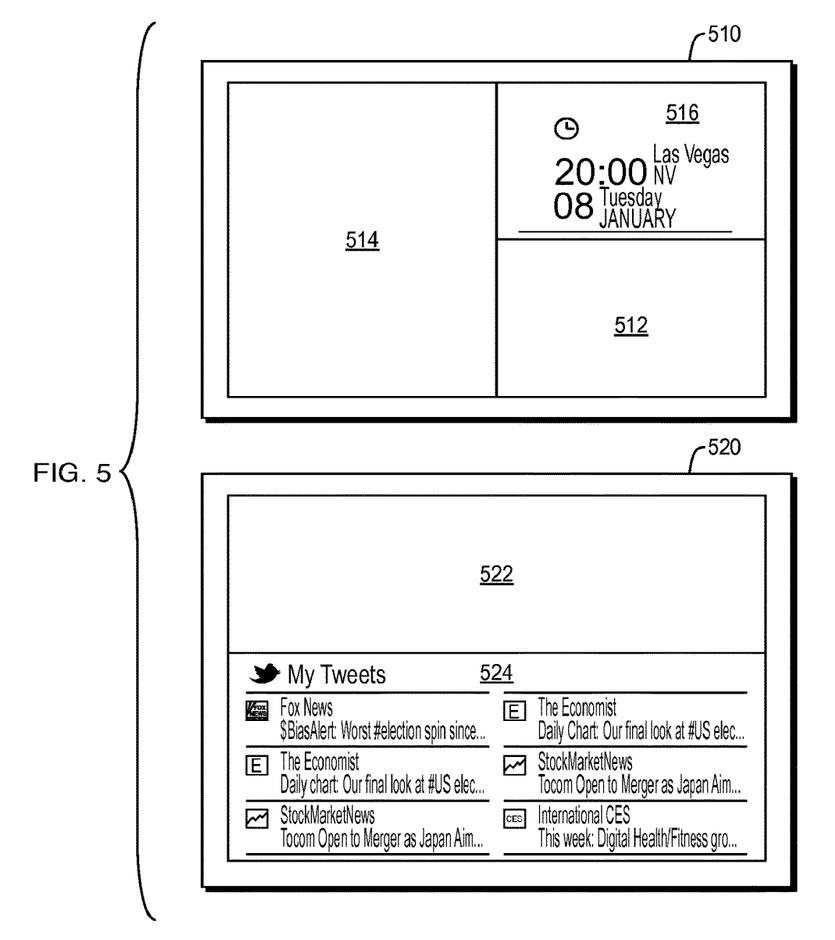
FIG. 5 is a depiction of an embodiment of the present invention, showing boxed areas, with applications and widgets sized to the boxes.

FIG. 5 depicts a series of widgets placed on and anchored to the board. Board 510 depicts a clock widget anchored to space 516, with spaces 512 and 514 remaining empty. Board 520 depicts a social media widget anchored to box 524 with box 522 remaining empty. In embodiments, the board composing system automatically resizes the widget for that panel, adjusting the visible functionality for the user. For example, if a clock widget was placed in a very small panel, the system 100 might only show a clock. If a clock widget is placed in a larger panel, the system 100 might also show the date, or an indication of time zone.

Figure 6:
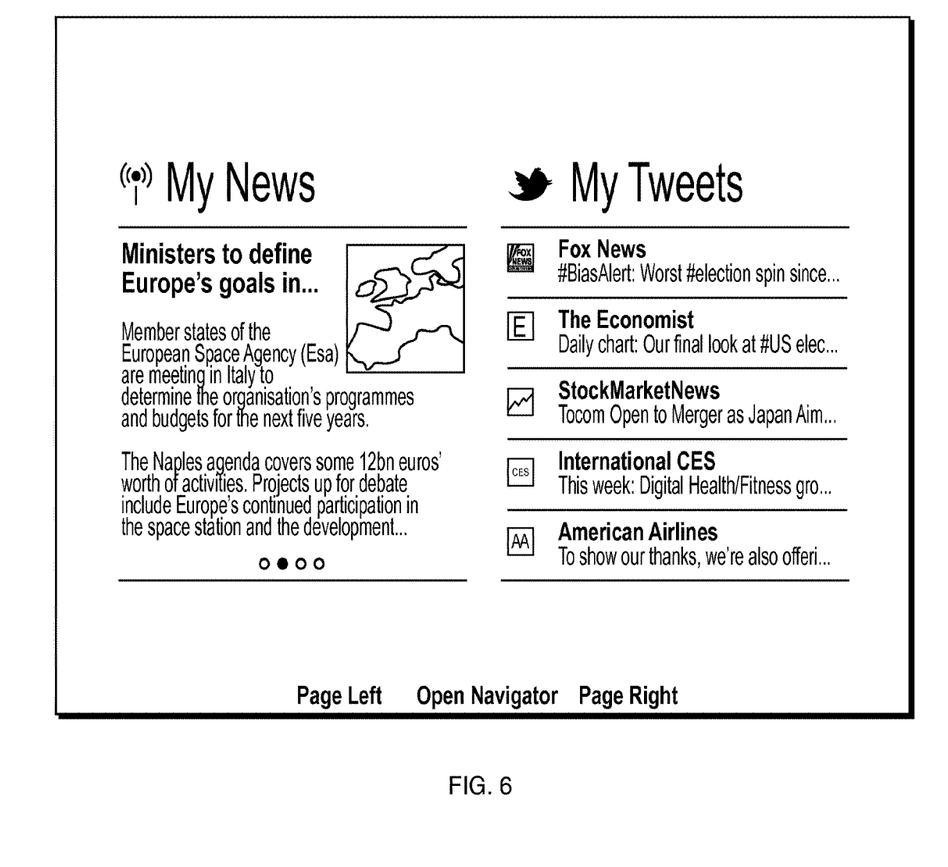
FIG. 6 is a more detailed view of exemplary boards of the present invention.

FIG. 6 depicts another example of a board according to aspects of the invention. Each displayed element (widget) is not only user selected but user positioned and user moveable/removable.

Figure 7:
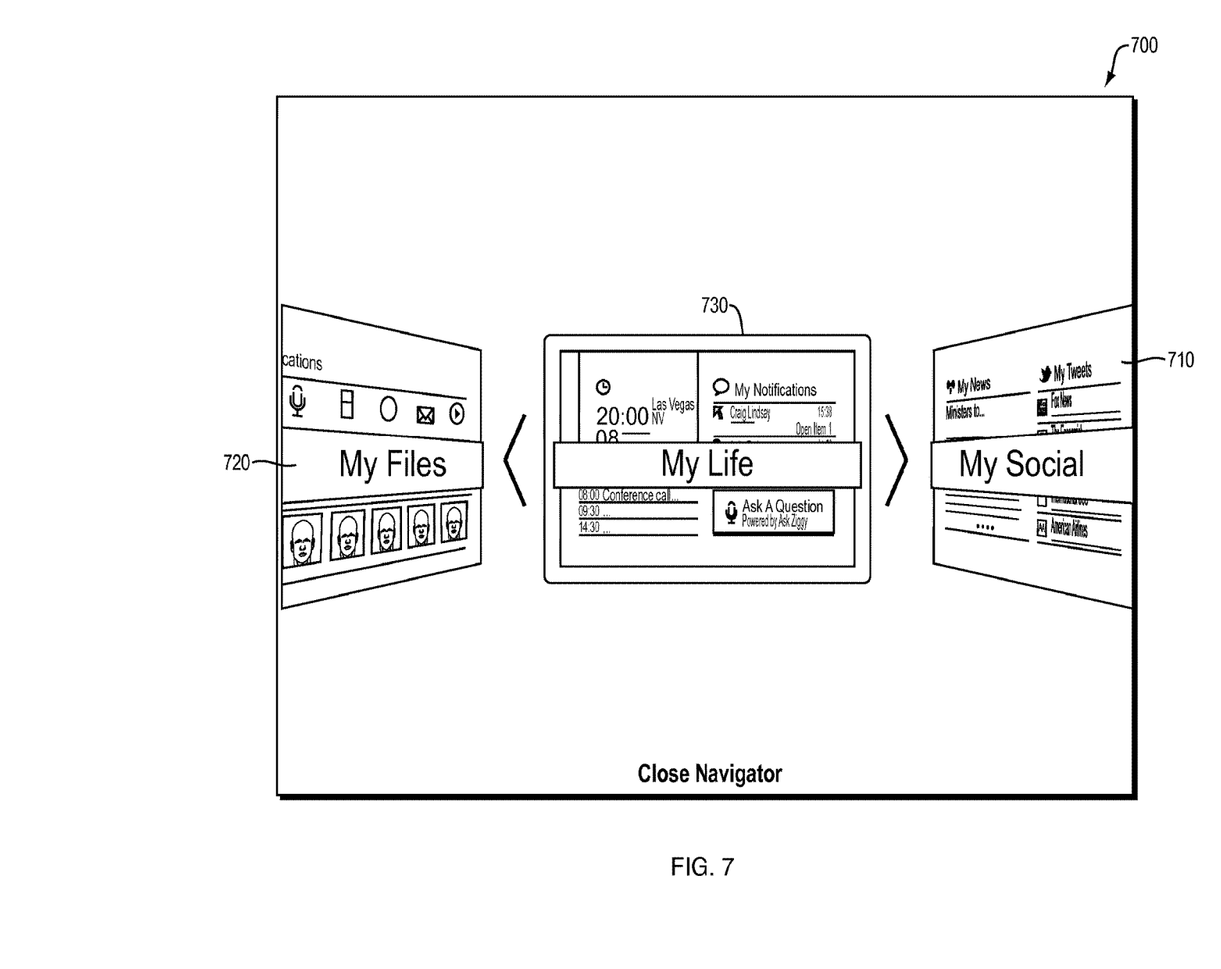
FIG. 7 is an example of multiple boards viewable at least in part within the depicted field of view.

FIG. 7 depicts another example of a series 700 of boards according to aspects of the present invention. The user is able to configure each working board. Each board has one or more panels. Each panel represents a respective application or content, e.g. My Photos. Each panel can be highlighted and then either moved or removed. In addition, the user is able to add a panel to a board. Board 710 is entitled "My Social" and contains user customized content direct to news and tweets. "My Life" Board, 730, contains a clock widget as well as notification icons, as well as an "Ask Ziggy" speech assistant interface. Finally, "My Files" Board 720 contains a series of icons representing applications available for launch, as well as user photos, pictures files, and a file manager utility. When the user zooms out, such as by using the Zoom Out voice command or a head, body or hand gesture, system 100 responds with a screen display view, as depicted in FIG. 7. This command presents the user with a zoomed out view allowing the user to view three boards or logical pages, such as the current one and the one to the left and right. If the user issues 'Zoom Out' when he has manipulated the screen view to be on one of the outer boards, then the system 100 renders only two boards for display. The overview may be a cinemascope like experience in embodiments.

While this invention has been particularly shown and described with references to example embodiments thereof, it will be understood by those skilled in the art that various changes in form and details may be made therein without departing from the scope of the invention encompassed by the appended claims.

For example, cursor (pointer, or the like) speed and/or acceleration during navigation in embodiments may be tracked and controlled by the HSC to provide additional effects as described in U.S. application Ser. No. 13/799,818 filed 13 Mar. 2013 (by Applicant) and herein incorporated by reference in its entirety.

What is claimed is:

1. A navigation and control method for a headset computer comprising:
displaying at a microdisplay of the headset computer a plurality of boards;
receiving at the headset computer an input comprising one or more head movements of a user of the headset computer; and
navigating between the boards in response to the input of the one or more head movements.

2. The method of claim 1, wherein the boards each include at least one user selected shortcut and operative widget.

3. The method of claim 1, wherein displaying at a headset computer a plurality of boards comprises displaying one board at a time at the headset computer.

4. The method of claim 1 wherein the one or more head movements are selected from the group consisting of a rotational head movement, a lateral head movement, and a flexion head movement.

5. The method of claim 1, wherein navigating between the boards includes switching between boards that are adjacent in a series of the boards.

6. The method of claim 5, wherein the series is user configurable.

7. The method of claim 1, wherein navigating between the boards in response to the input of the one or more head movements includes navigating between the boards at a speed based on the one or more head movements.

8. The method of claim 1 wherein each board is user configurable.

9. The method of claim 1, wherein receiving at the headset computer an input comprising one or more head movements includes using an accelerometer or a gyroscope.

10. The method of claim 1, wherein receiving at the headset computer an input comprising one or more head movements includes using an optical sensor.

11. The method of claim 1, further including navigating within at least one of the boards in response to the input of the one or more head movements.

12. The method of claim 11, wherein navigating within at least one of the boards includes panning or zooming within the board.

13. A headset computer system comprising:
a microdisplay;
a user interface configured to display via the microdisplay a plurality of boards; and
a processor configured to receive an input comprising one or more head movements of a user and navigate between the boards for display in response to the input of the one or more head movements.

14. The system of claim 13, wherein the boards each include at least one user selected shortcut and operative widget.

15. The system of claim 13, wherein the user interface is configured to display via the microdisplay one board at a time.

16. The system of claim 13, further including an accelerometer for use in determining the one or more head movements of the user.

17. The system of claim 13, further including a gyroscope for use in determining the one or more head movements of the user.

18. The system of claim 13, further including an optical sensor for use in determining the one or more head movements of the user.

19. The system of claim 13, wherein the one or more head movements are selected from the group consisting of a rotational head movement, a lateral head movement, and a flexion head movement.

20. The system of claim 13, wherein the processor is further configured to navigate between the boards in response to the input of the one or more head movements at a speed based on the one or more head movements.

* * * * *